United States Patent
Wei

(10) Patent No.: US 9,818,172 B2
(45) Date of Patent: *Nov. 14, 2017

(54) METHODS OF PROCESSING MOSAICKED IMAGES

(71) Applicant: MEDIATEK INC., Hsin-Chu (TW)

(72) Inventor: Ming-Chi Wei, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 20 days.

This patent is subject to a terminal disclaimer.

(21) Appl. No.: 15/012,811

(22) Filed: Feb. 1, 2016

(65) Prior Publication Data

US 2016/0148345 A1 May 26, 2016

Related U.S. Application Data

(63) Continuation of application No. 13/870,970, filed on Apr. 25, 2013, now Pat. No. 9,280,803.

(51) Int. Cl.
*G06T 3/40* (2006.01)

(52) U.S. Cl.
CPC .................... *G06T 3/4015* (2013.01)

(58) Field of Classification Search
CPC ............... G06T 3/4015; G06T 3/4069; H04N 2209/046
IPC .................................................... G06T 3/4015
See application file for complete search history.

(56) References Cited

U.S. PATENT DOCUMENTS

| | | | |
|---|---|---|---|
| 6,989,862 B2 | 1/2006 | Baharav | |
| 7,929,807 B2 | 4/2011 | Andersen | |
| 7,940,282 B2 | 5/2011 | Milanfar | |
| 7,965,888 B2 | 6/2011 | Linzer | |
| 8,170,331 B2 | 5/2012 | Shi | |
| 8,218,901 B2 | 7/2012 | Vercauteren | |
| 8,260,044 B2 | 9/2012 | Schwartz | |
| 8,369,653 B1 | 2/2013 | Cohen | |
| 2004/0056835 A1* | 3/2004 | Curry | H04N 1/41 345/100 |
| 2005/0018923 A1* | 1/2005 | Messina | G06K 9/00234 382/274 |
| 2005/0244052 A1* | 11/2005 | Keshet | G06T 3/4015 382/162 |
| 2006/0083440 A1 | 4/2006 | Chen | |
| 2006/0093234 A1 | 5/2006 | Silverstein | |
| 2007/0133902 A1 | 6/2007 | Kumar | |
| 2009/0304070 A1* | 12/2009 | Lamy-Bergot | H04N 21/2383 375/240.02 |
| 2010/0039563 A1 | 2/2010 | Lukac | |

(Continued)

FOREIGN PATENT DOCUMENTS

| | | |
|---|---|---|
| CN | 101473659 A | 7/2009 |
| CN | 101547370 A | 9/2009 |
| CN | 102254301 A | 11/2011 |

*Primary Examiner* — Jingge Wu
(74) *Attorney, Agent, or Firm* — Winston Hsu

(57) ABSTRACT

An embodiment of the invention provides a method of processing a mosaicked image. First, the mosaicked image is up-sampled along a first direction to generate a first intermediate image. Then, the first intermediate image is resized along the first direction to generate a second intermediate image. Next, the second intermediate image is up-sampled along a second direction to generate a third intermediate image. Afterward, the third intermediate image is resized along the second direction to generate a resized and partly demosaicked image.

9 Claims, 3 Drawing Sheets

(56) References Cited

U.S. PATENT DOCUMENTS

| | | |
|---|---|---|
| 2010/0110222 A1 | 5/2010 | Smith |
| 2010/0302384 A1 | 12/2010 | Sawada |
| 2011/0032269 A1 | 2/2011 | Lukac |
| 2011/0211756 A1 | 9/2011 | Linzer |
| 2012/0105691 A1 | 5/2012 | Waqas |
| 2012/0206582 A1* | 8/2012 | DiCarlo ................ G06T 3/4015 348/71 |
| 2013/0083838 A1* | 4/2013 | Touze .................. H04N 5/2355 375/240.01 |

* cited by examiner

METHODS OF PROCESSING MOSAICKED IMAGES

CROSS REFERENCE TO RELATED APPLICATION

This continuation application claims the benefit of U.S. application Ser. No. 13/870,970, which was filed on Apr. 25, 2013.

BACKGROUND

The invention relates generally to image processing, and more particularly, to methods of processing mosaicked images.

Nowadays, digital cameras are almost ubiquitous. There are not only stand-along digital cameras, but also digital cameras embedded in various kinds of electronic devices, such as smart phones and tablet computers. Even more, digital video cameras may also be regarded as digital cameras.

Generally speaking, a digital camera at least has a color sensor and a color filter array (CFA) overlaid on the color sensor. To name a few examples, the color sensor may be a charge coupled device (CCD) sensor or a complementary metal oxide semiconductor (CMOS) sensor; the CFA may be a Bayer CFA, an RGBC CFA, or a CYYM CFA.

A raw image generated by the digital camera is a mosaicked one, with pixels of different colors alternating on each horizontal line of pixels and on each vertical line of pixels. To be useful, the mosaicked image frequently needs to be processed. Some image processing method may ensure better image quality at the cost of more complex computation. Other image processing method may have simpler computation but may lead to inferior image quality.

SUMMARY

An embodiment of the invention provides a method of processing a mosaicked image. First, the mosaicked image is up-sampled along a first direction to generate a first intermediate image. Then, the first intermediate image is resized along the first direction to generate a second intermediate image. Next, the second intermediate image is up-sampled along a second direction to generate a third intermediate image. Afterward, the third intermediate image is resized along the second direction to generate a resized and partly demosaicked image.

Another embodiment of the invention provides a method of processing a mosaicked image. First, the mosaicked image is up-sampled along a first direction to generate a first intermediate image. Then, the first intermediate image is resized along the first direction to generate a second intermediate image. Next, the second intermediate image is up-sampled along a second direction to generate a third intermediate image. Afterward, the third intermediate image is resized along the second direction to generate a resized and partly demosaicked image. Then, the resized and partly demosaicked image is processed to generate a demosaicked and processed image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
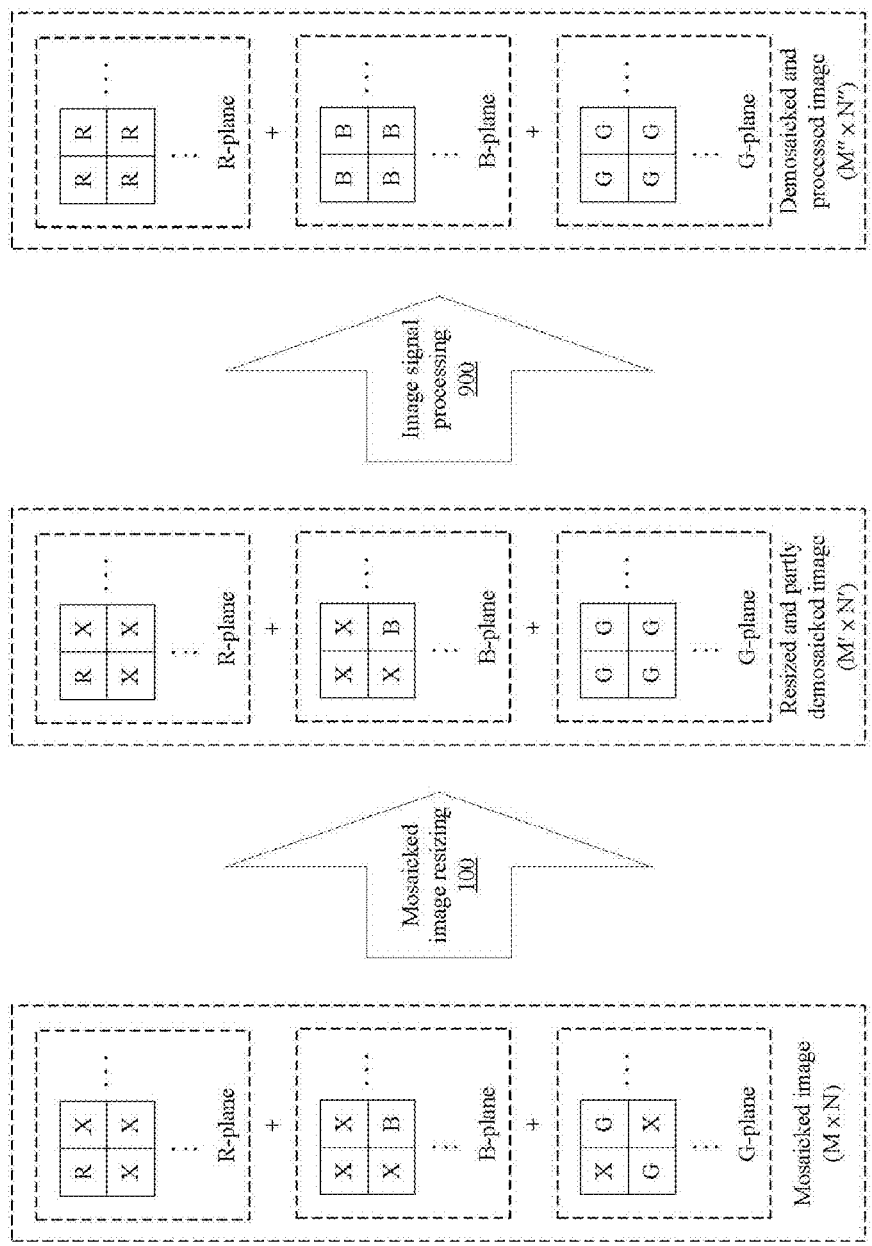
FIG. 1 is a schematic diagram illustrating an image processing method for processing a mosaicked image according to an embodiment of the invention.

FIG. 1 shows a schematic diagram illustrating an image processing method for processing a mosaicked image according to an embodiment of the invention. The image processing method includes a mosaicked image resizing method 100, an example of which is depicted in FIG. 2 and FIG. 3, and an image signal processing (ISP) method 900, which is depicted only in FIG. 1.

Figure 2:
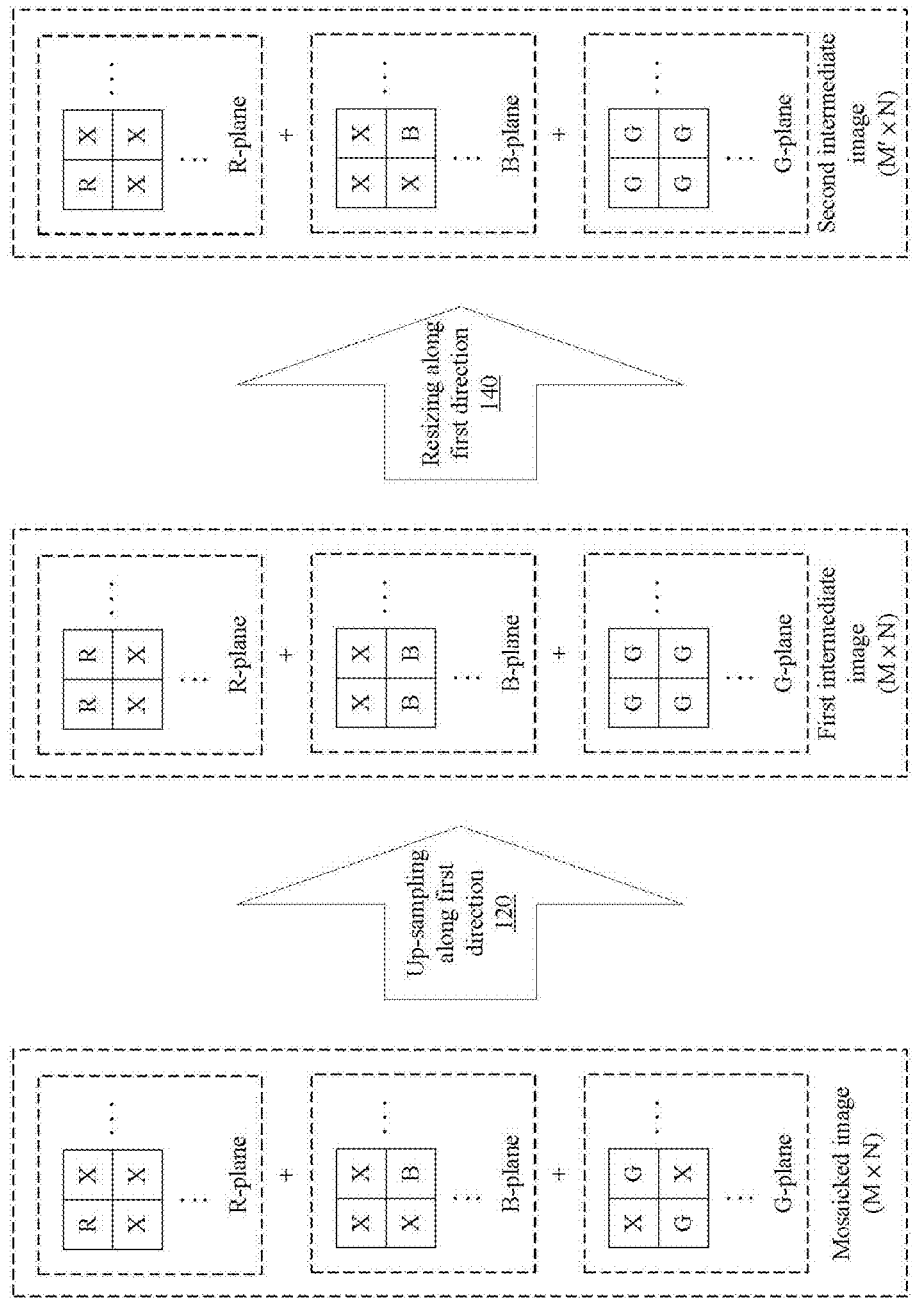
FIG. 2 and FIG. 3 are two schematic diagrams for further illustrating a step of the method depicted in FIG. 1.
Figure 3:
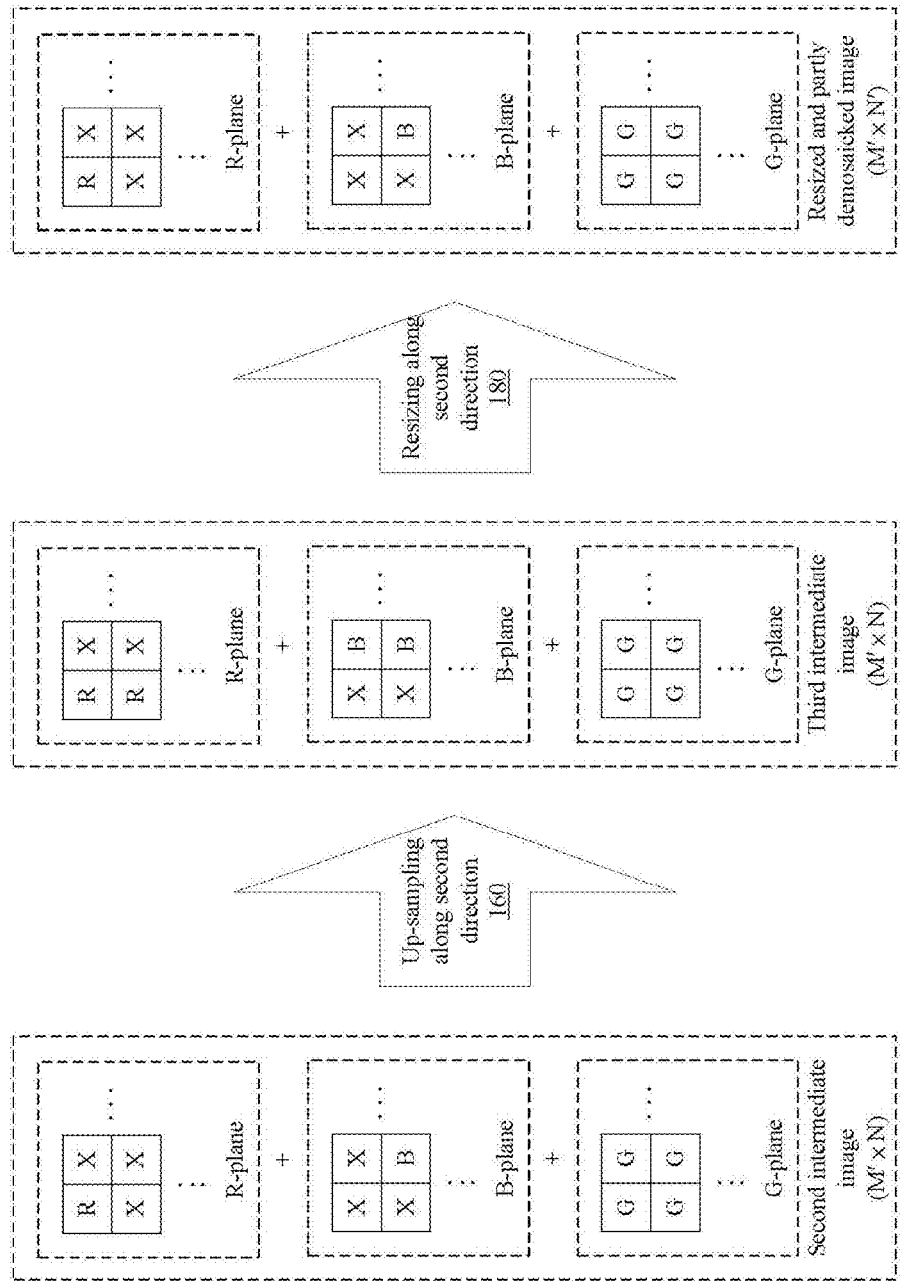

For the sake of simplicity, each of the exemplary images depicted in FIGS. 1, 2, and 3 is deconstructed into planes of different colors. For example, if the mosaicked image is generated using a Bayer CFA, the color planes may include a red (R) plane, a blue (B) plane, and a green (G) plane. In another example, a CFA of another kind (e.g. RGBC CFA or CYYM CFA) may be used to generate the mosaicked image.

In the figures, a rectangle encompassing a letter "X" represents a missing pixel in the corresponding color plane; a rectangle encompassing a letter "R", "B", or "G" represents an R, B, or G pixel in the corresponding color plane. If a color plane does not have any missing pixels, it may be referred to as a full-sampled color plane. On the other hand, if a color plane has some pixels missing, it may be referred to as a sub-sampled color plane. Using the mosaicked image and the resized and partly demosaicked image depicted in FIG. 1 as examples, the former has a sub-sampled R plane, a sub-sampled B plane, and a sub-sampled G plane, and the latter has a sub-sampled R plane, a sub-sampled B plane, and a full-sampled G plane.

The image processing method depicted in FIG. 1 enables an electronic device to convert the mosaicked image into a demosaicked and processed image. The mosaicked image has M columns and N rows of pixels, where M and N are two positive integers. In other words, the resolution of the mosaicked image is M×N. The resolution of the demosaicked and processed image is M"×N", where M" is a positive integer less than or equal to M and N" is a positive integer less than or equal to N.

The mosaicked image resizing method 100 depicted in FIG. 1, FIG. 2, and FIG. 3 enables the electronic device to first convert the mosaicked image into a resized and partly demosaicked image. The resolution of the resized and partly demosaicked image is M'×N', where M' is a positive integer less than or equal to M and N' is a positive integer less than or equal to N. For example, M' and N' may be equal to M" and N", respectively.

The modifier "partly demosaicked" indicated that the resized and partly demosaicked image may have at least one full-sampled color plane. In other words, the resized and partly demosaicked image may have at least one color plane with no missing pixels. After the mosaicked image resizing method 100, the image signal processing method 900 depicted in FIG. 1 enables the electronic device to convert the resized and partly demosaicked image into the demosaicked and processed image. To name a few examples, the image signal processing method 900 may include demosaicking, gamma correction, color correction, noise reduction, and edge enhancement, etc.

Please refer to FIG. 2 and FIG. 3. In the mosaicked image resizing method 100, the electronic device first performs up-sampling and resizing along a first direction, and then performs up-sampling and resizing along a second direction. Although in the depicted example the first and second directions are the horizontal and vertical directions, respectively, in other examples the first and second directions may be the vertical and horizontal directions, respectively. Please note that if the first and second directions are horizontal and vertical directions, respectively, lines along the first direction and lines along the second direction will be rows and columns, respectively. On the other hand, if the first and second directions are vertical and horizontal directions, respectively, lines along the first direction and lines along the second direction will be columns and rows, respectively.

Please refer to FIG. 2. At step 120 of the mosaicked image resizing method, the electronic device up-samples the mosaicked image along the first direction to generate a first intermediate image, the resolution of which may still be M×N. In other words, at step 120, the electronic device up-samples lines along the first direction in each color plane. After being up-sampled, an originally sub-sampled line may become a full-sampled line or become a sub-sampled line with fewer missing pixels, an originally not-sampled line may remain not-sampled (i.e. remain intact), and an originally full-sampled line may remain full-sampled (i.e. remain intact). As used herein, a line is sub-sampled if it has alternating missing pixels (each represented by a symbol 'X' in the figure) and existing pixels (each represented by a symbol 'R', 'G', or 'B' in the figure), is full-sampled if it has no missing pixels, and is not-sampled if it has only missing pixels. For example, the alternation period of a sub-sampled line may be n pixels, where n is an integer greater than 1 and each period of alternation may have 1 existing pixel and (n−1) missing pixels. In other words, 1/n pixels of the sub-sampled line may be existing pixels while the rest (n−1)/n pixels may be missing pixels.

Using the mosaicked image of FIG. 1 and FIG. 2 as an example, in its R plane, odd horizontal lines are sub-sampled and even horizontal lines are not-sampled. At step 120, the electronic device converts the sub-sampled odd horizontal lines into full-sampled lines, e.g. through horizontal interpolation. In the meantime, even horizontal lines in the R plane remain not-sampled. Similarly, in the B plane of the mosaicked image, even horizontal lines are sub-sampled and odd horizontal lines are not-sampled. At step 120, the electronic device converts the sub-sampled even horizontal lines into full-sampled lines, e.g. through horizontal interpolation. In the meantime, odd horizontal lines in the B plane remain not-sampled. In the G plane of the mosaicked image, all horizontal lines are sub-sampled. At step 120, the electronic device converts all the horizontal lines into full-sampled lines, e.g. through horizontal interpolation. Because the resulting G plane in the first intermediate image has only full-sampled lines, the G plane has become a full-sampled color plane.

Then, at step 140 of the mosaicked image resizing method, the electronic device resizes the first intermediate image along the first direction to generate a second intermediate image, the resolution of which may be M'×N. In other words, at step 140, the electronic device converts lines with M pixels along the first direction into lines with M' pixels along the first direction. The G plane of the second intermediate image is full-sampled; every line therein is full-sampled.

The R plane of the second intermediate image is a sub-sampled color plane. For example, odd horizontal lines and odd vertical lines therein are sub-sampled while even horizontal lines and even vertical lines therein are not-sampled. As another example, odd horizontal lines and even vertical lines therein are sub-sampled while even horizontal lines and odd vertical lines therein are not-sampled. Of course, missing and existing pixels may be arranged in the sub-sampled R plane in a way that's different from the aforementioned two examples. Similarly, the B plane of the second intermediate image is a sub-sampled color plane. For example, even horizontal lines and even vertical lines therein are sub-sampled while odd horizontal lines and odd vertical lines therein are not-sampled. As another example, even horizontal lines and odd vertical lines therein are sub-sampled while odd horizontal lines and even vertical lines therein are not-sampled. Of course, missing and existing pixels may be arranged in the sub-sampled B plane in a way that's different from the aforementioned two examples.

Please refer to FIG. 3. At step 160 of the mosaicked image resizing method, the electronic device up-samples the second intermediate image along the second direction to generate a third intermediate image, the resolution of which may still be M'×N. In other words, at step 160, the electronic device up-samples lines along the second direction in each color plane.

For example, assuming that in the R plane of the second intermediate image, odd vertical lines are sub-sampled and even vertical lines are not-sampled. At step 160, the electronic device converts the sub-sampled odd vertical lines into full-sampled lines, e.g. through vertical interpolation. In the meantime, even vertical lines in the R plane remain not-sampled. Similarly, assuming that in the B plane of the second intermediate image, even vertical lines are sub-sampled and odd vertical lines are not-sampled. At step 160, the electronic device converts the sub-sampled even vertical lines into full-sampled lines, e.g. through vertical interpolation. In the meantime, odd vertical lines in the B plane remain not-sampled. In the G plane of the second intermediate image, all vertical lines are already full-sampled. Therefore, the electronic device may leave the G plane alone at step 160. In other words, the G plane may remain intact after step 160.

Then, at step 180 of the mosaicked image resizing method, the electronic device resizes the third intermediate image along the second direction to generate the resized and partly demosaicked image, the resolution of which may be M'×N'. In other words, at step 180, the electronic device converts lines with N pixels along the second direction into lines with N' pixels along the second direction. The G plane of the resized and partly demosaicked image is full-sampled; every line (whether horizontal or vertical) therein is full-sampled.

The R plane of the resized and partly demosaicked image is a sub-sampled color plane. For example, odd horizontal lines and odd vertical lines therein are sub-sampled while even horizontal lines and even vertical lines therein are not-sampled. As another example, even horizontal lines and odd vertical lines therein are sub-sampled while odd horizontal lines and even vertical lines therein are not-sampled. Of course, missing and existing pixels may be arranged in the sub-sampled R plane in a way that's different from the aforementioned two examples. Similarly, the B plane of the resized and partly demosaicked image is a sub-sampled color plane. For example, even horizontal lines and even vertical lines therein are sub-sampled while odd horizontal lines and odd vertical lines therein are not-sampled. As another example, odd horizontal lines and even vertical lines therein are sub-sampled while even horizontal lines and odd vertical lines therein are not-sampled. Of course, missing and existing pixels may be arranged in the sub-sampled B plane in a way that's different from the aforementioned two examples.

The image processing method mentioned above has several advantages, some of which are briefly discussed below. First, because the resized and partly demosaicked image (rather than the mosaicked image, the resolution of which may be much higher than that of the resized and partly demosaicked image) is processed at step 900, step 900 has a relatively lower computation demand. In addition, because in the mosaicked image resizing method, horizontal resizing is performed only after horizontal up-sampling, and vertical resizing is performed only after vertical up-sampling, the resized and partly demosaicked image may have a relatively better quality. Because of this, the demosaicked and processed image may also retain a relatively better quality. For example, the demosaicked and processed image may have fewer artifacts such as aliasing and false colors.

In sum, the image processing method mentioned above may not only reduce the computation demand, but may also ensure better image quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of processing a mosaicked image, comprising:
   up-sampling the mosaicked image along a direction to generate a group of pixel data; and
   resizing the group of pixel data along the direction to generate an image comprising at least one full-sampled color plane and at least one sub-sampled color plane;
   wherein odd lines along the direction in a first color plane of the mosaicked image are sub-sampled, even lines along the direction in a second color plane of the mosaicked image are sub-sampled, and all lines along the direction in a third color plane of the mosaicked image are sub-sampled, and the step of up-sampling the mosaicked image along the direction to generate the group of pixel data comprises:
   converting the odd lines along the direction in the first color plane into full-sampled lines;
   converting the even lines along the direction in the second color plane into full-sampled lines; and
   converting all the lines along the direction in the third color plane into full-sampled lines.

2. The method of claim 1, wherein the step of up-sampling the mosaicked image along the direction to generate the group of pixel data comprises:
   in each color plane of the mosaicked image, up-sampling each sub-sampled line along the direction through interpolation along the direction.

3. A method of processing a mosaicked image, comprising:
   up-sampling the mosaicked image along a direction to generate a group of pixel data;
   resizing the group of pixel data along the direction to generate an image comprising at least one full-sampled color plane and at least one sub-sampled color plane;
   up-sampling the image along a different direction to generate a different group of pixel data; and
   resizing the different group of pixel data along the different direction to generate a resized and partly demosaicked image;
   wherein odd lines along the different direction in a first color plane of the image are sub-sampled, even lines along the different direction in a second color plane of the image are sub-sampled, and all lines along the different direction in a third color plane of the image are full-sampled, and the step of up-sampling the image along the different direction to generate the different group of pixel data comprises:
   converting the odd lines along the different direction in the first color plane into full-sampled lines; and
   converting the even lines along the different direction in the second color plane into full-sampled lines.

4. The method of claim 3, wherein the step of up-sampling the image along the different direction to generate the different group of pixel data comprises:
   in each color plane of the image, up-sampling each sub-sampled line along the different direction through interpolation along the different direction.

5. A method of processing a mosaicked image, comprising:
   up-sampling and resizing the mosaicked image along a direction to generate an image comprising at least one full-sampled color plane and at least one sub-sampled color plane;
   wherein odd lines along the direction in a first color plane of the mosaicked image are sub-sampled, even lines along the direction in a second color plane of the mosaicked image are sub-sampled, and all lines along the direction in a third color plane of the mosaicked image are sub-sampled, and the step of up-sampling and resizing the mosaicked image along the direction to generate the image comprises:
   converting the odd lines along the direction in the first color plane into full-sampled lines;
   converting the even lines along the direction in the second color plane into full-sampled lines; and
   converting all the lines along the direction in the third color plane into full-sampled lines.

6. The method of claim 5, wherein the step of up-sampling and resizing the mosaicked image along the direction to generate the image comprises:
   in each color plane of the mosaicked image, up-sampling and resizing each sub-sampled line along the direction through interpolation along the direction.

7. A method of processing a mosaicked image, comprising:
   up-sampling and resizing the mosaicked image along a direction to generate an image comprising at least one full-sampled color plane and at least one sub-sampled color plane; and
   up-sampling and resizing the image along a different direction to generate a resized and partly demosaicked image;
   wherein odd lines along the different direction in a first color plane of the image are sub-sampled, even lines along the different direction in a second color plane of the image are sub-sampled, and all lines along the different direction in a third color plane of the image are full-sampled, and the step of up-sampling and resizing the image along the different direction to generate the resized and partly demosaicked image comprises:
   converting the odd lines along the different direction in the first color plane into full-sampled lines; and converting the even lines along the different direction in the second color plane into full-sampled lines.

8. The method of claim 7, wherein the step of up-sampling and resizing the image along the different direction to generate the resized and partly demosaicked image comprises:
in each color plane of the image, up-sampling and resizing each sub-sampled line along the different direction through interpolation along the different direction.

9. The method of claim 7, wherein a resolution of the resized and partly demosaicked image is smaller than a resolution of the mosaicked image.

\* \* \* \* \*